(12) United States Patent
Kröber et al.

(10) Patent No.: US 8,271,159 B2
(45) Date of Patent: Sep. 18, 2012

(54) METHOD AND CONTROL SYSTEM FOR STABILIZING A VEHICLE

(75) Inventors: Jürgen Kröber, Winningen (DE); Michael Horn, Steinbach/Ts (DE); Mirja Abel, Frankfurt/M (DE); Günther Reith, Ginsheim (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 1224 days.

(21) Appl. No.: 11/886,496

(22) PCT Filed: Mar. 15, 2006

(86) PCT No.: PCT/EP2006/060769
§ 371 (c)(1),
(2), (4) Date: Mar. 13, 2008

(87) PCT Pub. No.: WO2006/097498
PCT Pub. Date: Sep. 21, 2006

(65) Prior Publication Data
US 2008/0275603 A1    Nov. 6, 2008

(30) Foreign Application Priority Data

Mar. 17, 2005    (DE) .......................... 10 2005 012 857
Mar. 15, 2006    (DE) .......................... 10 2006 012 246

(51) Int. Cl.
*B60T 8/172* (2006.01)

(52) U.S. Cl. ......................................................... 701/29
(58) Field of Classification Search ..................... 701/29
See application file for complete search history.

(56) References Cited

U.S. PATENT DOCUMENTS

| | | | |
|---|---|---|---|
| 6,460,647 B1 * | 10/2002 | Schmitt | 180/197 |
| 6,554,293 B1 * | 4/2003 | Fennel et al. | 280/5.502 |
| 6,633,006 B1 * | 10/2003 | Wolf et al. | 177/25.13 |
| 7,029,014 B2 * | 4/2006 | Hamm | 280/5.502 |
| 2006/0138733 A1 * | 6/2006 | Clauson | 280/5.508 |

FOREIGN PATENT DOCUMENTS

| | | |
|---|---|---|
| DE | 19728769 | 1/1999 |
| DE | 19728867 | 1/1999 |
| DE | 19918563 | 10/1999 |
| DE | 19830189 | 11/1999 |
| DE | 19827881 | 12/1999 |
| DE | 19837380 | 2/2000 |
| DE | 10144699 | 4/2002 |
| EP | 1382948 | 1/2004 |
| WO | 2005039955 | 5/2005 |

* cited by examiner

*Primary Examiner* — Drew Brown
(74) *Attorney, Agent, or Firm* — Brinks Hofer Gilson & Lione

(57) ABSTRACT

A method of stabilizing a vehicle, in particular for stabilizing the vehicle with respect to tilting movements, to the load condition of the vehicle, performs a control depending on a load condition of the vehicle, and the load condition of the vehicle is determined by way of a vehicle mass that is established due to a balance of forces that act on the vehicle, and/or by way of a characteristic speed of the vehicle.

12 Claims, 2 Drawing Sheets

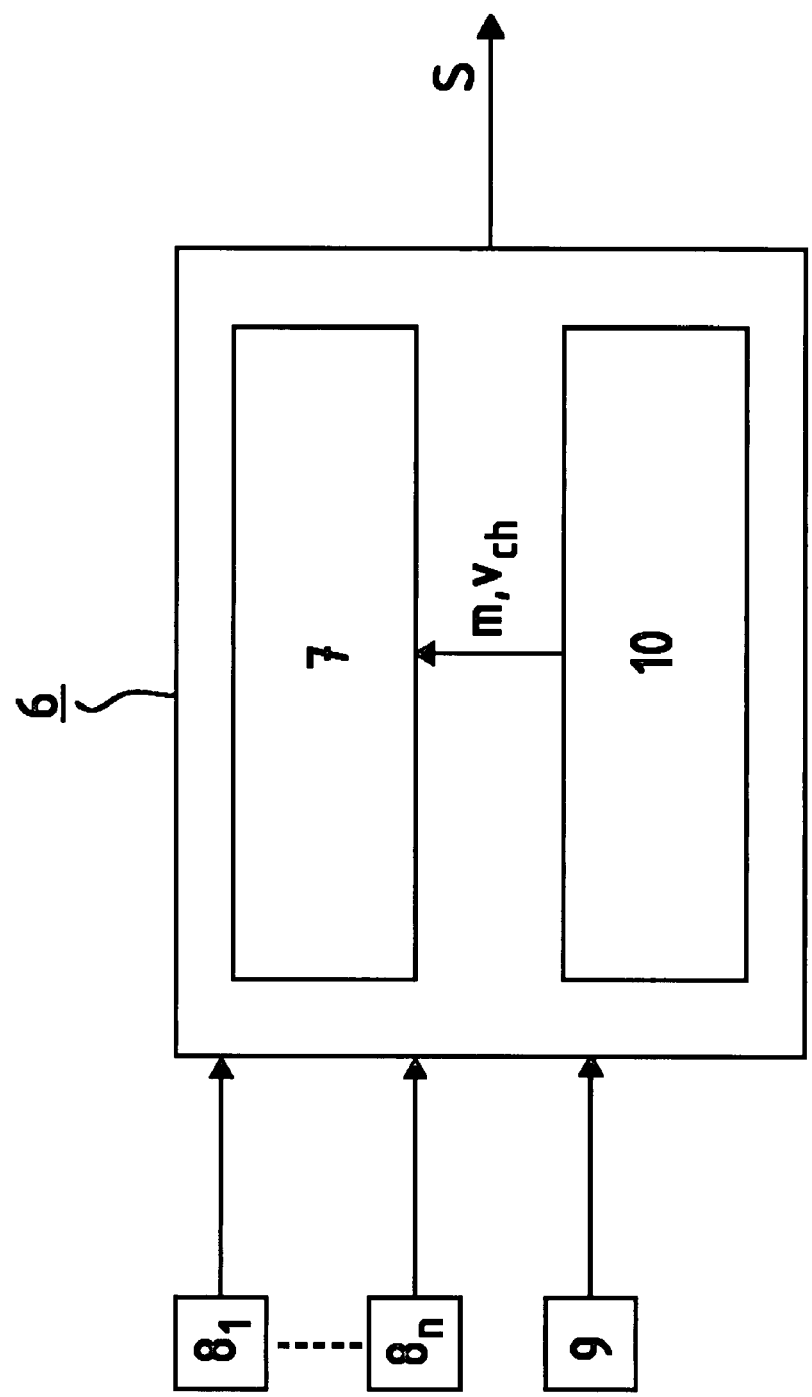

METHOD AND CONTROL SYSTEM FOR STABILIZING A VEHICLE

BACKGROUND OF THE INVENTION

The present invention relates to a method for stabilizing a vehicle, in particular for stabilizing it with respect to tilting movements.

Further, the invention relates to a driving dynamics control system that is appropriate to implement the method.

In order to enhance the safety of vehicles, it is known to employ driving dynamics control systems such as the known ESP (ESP: Electronic Stability Program), which increase the driving stability of a vehicle by interventions into the brake system, the driving engine, or into the steering system.

It is furthermore known in the art to integrate rollover stability control systems into systems of this kind, which reduce the lateral forces that act on the vehicle in critical driving situation, for example by purposefully braking one wheel, and thus prevent the vehicle from tilting. Control systems of this type are e.g. known by the name ARP (ARP: Active Rollover Protection).

It has shown that the load condition is highly significant with regard to the driving performance of a vehicle. This applies in particular to the rollover stability, which reduces considerably in the event of high service load, when the vehicle has a high center of gravity, as is the case in vans or SUVs (SUV: Sports Utility Vehicle) or off-road vehicles, for example.

For this reason, the problem is frequently encountered that driving dynamics systems—depending on their adaptation to a defined load condition—intervene into the driving performance excessively, or too early, or insufficiently, or too late. As a result, driving dynamics control becomes either uncomfortable, or it does not safeguard vehicle safety to an appropriate degree.

In view of the above, an object of the invention is to provide a maximum comfortable and safe driving dynamics control in different load conditions of the vehicle.

SUMMARY OF THE INVENTION

According to the invention, this object is achieved by a method w for stabilizing a vehicle, in particular for stabilizing it with respect to tilting movements, applying a control method to determine correcting variables for the activation of at least one actuator by means of which the driving performance of the vehicle can be influenced. It is disclosed that the control method is performed depending on a load condition of the vehicle, and the load condition of the vehicle is determined by way of a vehicle mass that is established due to a balance of forces that act on the vehicle, and/or by way of a characteristic speed of the vehicle.

In addition, a driving dynamics control system for stabilizing a vehicle, in particular for stabilizing it with respect to tilting movements, is provided, which comprises a control unit in which correcting variables for the activation of at least one actuator can be established, by which the driving performance of the vehicle can be influenced. The driving dynamics control system is characterized in that the correcting variables can be established depending on a load condition of the vehicle, and the load condition of the vehicle can be determined by way of a vehicle mass that can be established due to a balance of forces that act on the vehicle, and/or by way of a characteristic speed of the vehicle.

The invention is especially apt for use in connection with a method of stabilizing a vehicle with respect to tilting movements. Equally, however, the invention can be employed using different control methods, in which correcting variables are established to activate actuators that intervene into the driving performance of the vehicle in a stabilizing manner.

The term 'load condition' under the invention refers to the size of the service load and the distribution of a load within the vehicle. The size of the service load is advantageously established by way of the vehicle mass, and the distribution of the load, having e.g. an influence on the vehicle's center of gravity, is permitted by way of the characteristic speed of the vehicle. It has shown in this regard that the characteristic speed of the vehicle reduces in the event of an increase in service load and/or in the event of displacement of the vehicle's center of gravity in an upward direction so that a reduced rollover stability of the vehicle can be deduced from a reduction of the value of the characteristic speed.

In a particularly preferred embodiment of the method of the invention and the driving dynamics control system of the invention, arrangements are made that it is checked by means of at least one predetermined criterion whether a first predetermined driving situation prevails, and that the balance of forces is evaluated when it is detected that the first predetermined driving situation prevails.

A reliable determination of the vehicle mass is this way ensured. It has shown that an especially exact determination of the vehicle mass is possible in acceleration processes.

Therefore, a particularly favorable embodiment of the method of the invention and the driving dynamics control system of the invention provides that the first predetermined driving situation prevails when the vehicle acceleration exceeds an acceleration threshold value.

Further, a particularly advantageous embodiment of the method of the invention and the driving dynamics control system of the invention is characterized in that the first predetermined driving situation prevails when the absolute value of a yaw rate of the vehicle is lower than a yaw rate threshold value.

It is hereby safeguarded that only such driving situations are considered, in which the vehicle does not perform an excessive yaw motion, which would impair the accuracy of the determination of mass performed on the basis of the balance of forces.

In addition, it has been found out in driving tests that an especially exact determination of the vehicle mass by way of the balance of forces is possible when the gradient of an engine torque of a driving engine of the vehicle is not too high.

Therefore, it is provided in a likewise favorable embodiment of the method of the invention and the driving dynamics control system of the invention, that the first predetermined driving situation prevails when the absolute value of a gradient of an engine torque is lower than an engine torque gradient threshold value.

A preferred improvement of the method of the invention and the driving dynamics control system of the invention is characterized in that the vehicle mass is established by way of a learning algorithm, and in each case an instantaneous assessed value for the vehicle mass is established at different points of time, and the vehicle mass is determined from the instantaneous assessed values by way of averaging.

This will further increase the reliability of the mass determination.

In addition, a favorable embodiment of the method of the invention and the driving dynamics control system of the invention arranges for the vehicle mass to be determined as a weighted average value, and an instantaneous assessed value that is established in a moment is included with a first weight in the average value, and a previously determined value of the vehicle mass is included with a second weight in the average value.

Preferably, the second weight is higher than the first weight.

In addition, a preferred improvement of the method of the invention and the driving dynamics control system of the invention is characterized in that a number of learning cycles is counted, and one learning cycle corresponds to a coherent period in which the predetermined driving situation prevails.

In particular, a favorable embodiment of the method of the invention and the driving dynamics control system of the invention comprises that the criterion is more narrowly restricted with a rising number of learning cycles.

Due to more narrowly restricted criteria for the detection of the driving situations, in which the vehicle mass is determined, driving situations are only considered with a rising number of learning cycles, which render a particularly exact mass determination possible. This way, the accuracy of the established mass value increases with the number of the learning cycles to a high degree.

A particularly suitable embodiment of the method of the invention and the driving dynamics control system of the invention is characterized in that the acceleration threshold value is increased with a rising number of learning cycles.

Furthermore, it is provided in a likewise suitable embodiment of the method of the invention and the driving dynamics control system of the invention that the yaw rate threshold value is reduced with a rising number of learning cycles.

Also, a favorable embodiment of the method of the invention and the driving dynamics control system of the invention involves that the engine torque gradient threshold value is reduced with a rising number of learning cycles.

In addition, it is provided in a particularly advantageous embodiment of the method of the invention and the driving dynamics control system of the invention that a ratio between the first weight and the second weight is determined depending on the number of the learning cycles.

It can be achieved this way that a value of the vehicle mass, which has been determined in a later learning cycle based on narrower criteria for the determination of the learning situation, is included with a higher weight in the average value.

Furthermore, it is checked in a preferred embodiment of the method of the invention and the driving dynamics control system of the invention whether a second predetermined driving situation prevails, and that the characteristic speed is established when it is detected that the second predetermined driving situation prevails.

It is suitably provided that the second driving situation concerns a cornering maneuver.

A favorable embodiment of the method of the invention and the driving dynamics control system of the invention arranges for the control method to be implemented when the absolute value of a driving condition variable of the vehicle is higher than an activation threshold value, with the activation threshold value being determined depending on the load condition of the vehicle.

It is especially favorable to perform control interventions at an earlier time in the event of an increased service load of the vehicle, since the rollover stability of the vehicle is generally lower due to a higher service load. Therefore, a preferred embodiment of the method of the invention and the driving dynamics control system of the invention is characterized in that the activation threshold value is reduced with a rising vehicle mass.

In the event of an increased service load and/or a displacement of the vehicle's center of gravity in an upward direction, the vehicle tends to a more pronounced understeering behavior, which can be noticed in a reduction of the characteristic speed.

Since an increase in service load as well as a displacement of the vehicle's center of gravity in an upward direction have unfavorable effects on the rollover stability of the vehicle, it is provided in a likewise preferred embodiment of the method of the invention and the driving dynamics control system of the invention that the activation threshold value decreases with a reducing characteristic speed.

A rollover tendency of the vehicle can be detected by way of the lateral acceleration in a particularly reliable manner. Therefore, a preferred embodiment of the method of the invention and the driving dynamics control system of the invention involves that the driving condition variable is a lateral acceleration of the vehicle.

Further advantages, special features, and appropriate improvements of the invention can be seen in the sub claims and the following description of preferred embodiments by way of the Figures.

BRIEF DESCRIPTION OF THE DRAWINGS

In the Figures:

FIG. 2 is a schematic block diagram of a driving dynamics control system with a computing unit for determining the load condition of the motor vehicle.

DETAILED DESCRIPTION OF THE DRAWINGS

Figure 1:
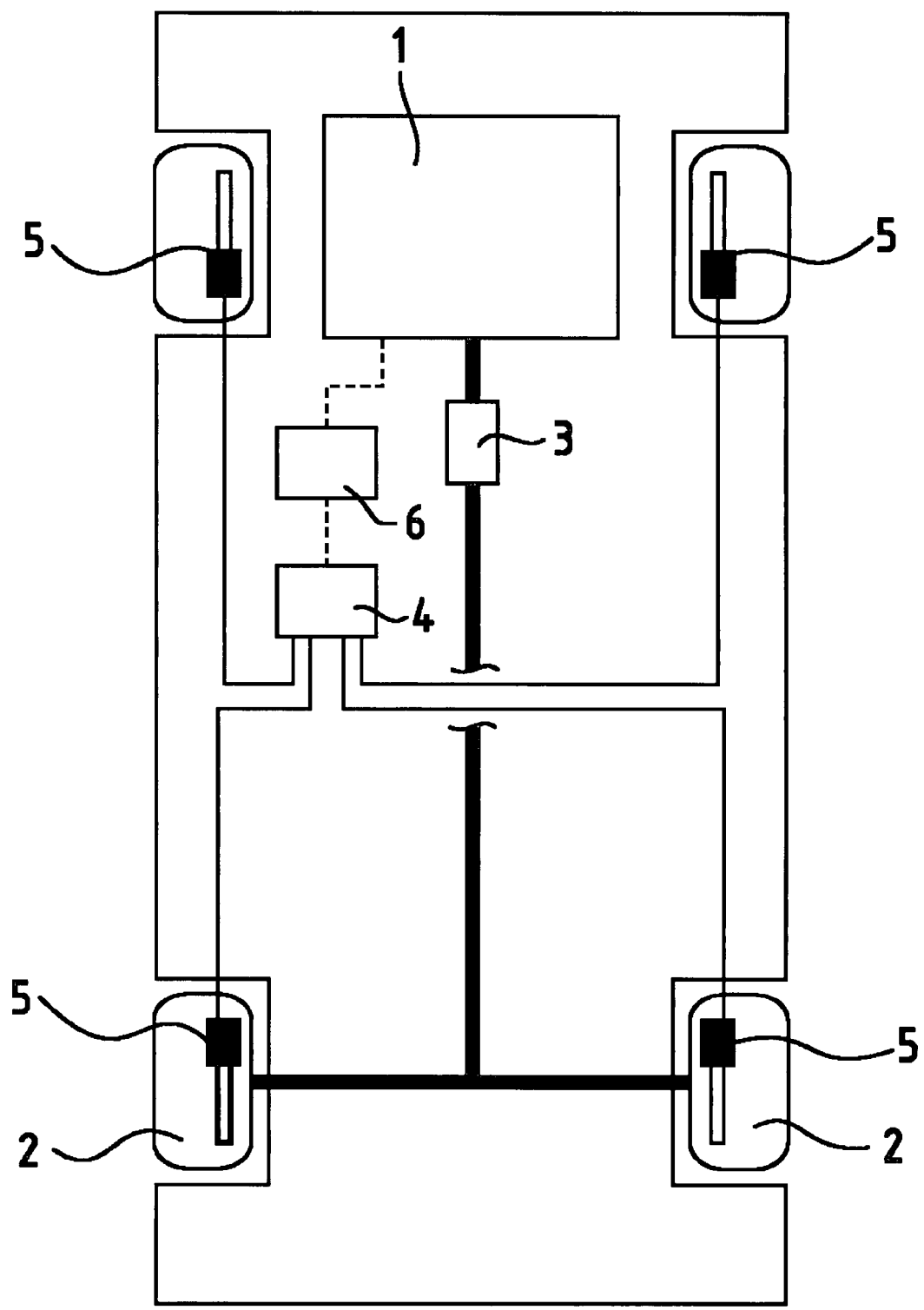
FIG. 1 is a schematic view of a motor vehicle in which the invention can be implemented.

FIG. 1 shows a schematic view of a vehicle equipped with a driving engine 1 that connects to the driven wheels of the vehicle via a drive train. In the embodiment illustrated in FIG. 1, the driven wheels are the rear wheels 2 of the vehicle. However, it can also be arranged that the vehicle is equipped with a front-wheel drive or all-wheel drive. A transmission 3 is installed in the drive train, in which a transmission ratio between an engine output shaft and a wheel drive shaft can be adjusted by way of a gear selector. The transmission 3 can be designed as a manually operated transmission, an automatic or automated transmission.

Furthermore, the vehicle is equipped with a brake system, which is designed as a hydraulic brake system, for example. Apart from the application by the driver (not shown in FIG. 1), the brake system allows pressure buildup by an electro-hydraulic pressure unit 4. The brake pressure built up is transmitted to wheel brakes 5, and it is provided that different brake pressures are adjustable in different wheel brakes 5 using valves inside the pressure unit 4.

To perform driving dynamics control and, in particular, to carry out a rollover stabilization, the vehicle is equipped with a driving dynamics controller 6, in which one or more correcting variables are determined to activate one or more actuators for influencing the driving performance of the vehicle. In the embodiment of the invention illustrated in FIG. 1, activation of the pressure unit 4 of the brake system of the vehicle and activation of the driving engine 1 or the engine control is arranged. The interventions allow braking the vehicle in such a fashion that high lateral forces are reduced and, thus, the driving stability is enhanced. Equally or alternatively, it is, however, also feasible to use the driving dynamics controller 6 to activate a steering actuator that intervenes into the steering line of the vehicle in order to stabilize the vehicle by adjustment of an appropriate steering angle.

The driving dynamics controller 6 is represented in a block diagram in FIG. 2. It includes a control unit 7 for implementing the control method for driving dynamics control, in which the correcting variables S for the activation of the actuators depending on driving-dynamics quantities and operating condition quantities of the vehicle are determined. These quantities are measured by sensors $8_1, \ldots, 8_n$ of the vehicle, which are connected to the driving dynamics controller 6 in terms of signals, or determined from measured quantities, or they are provided by one or more control devices 9 of the vehicle.

The sensor means for determining driving-dynamics quantities typically comprises a sensor cluster, made up of a longitudinal acceleration sensor, a lateral acceleration sensor and a yaw rate sensor. A steering angle sensor usually senses a steering angle set by the driver at the steerable wheels of the vehicle, and the signals thereof are sent to the driving dynamics controller 6. The vehicle speed and the vehicle acceleration are typically determined by way of signals of wheel rotational speed sensors, and the determination is generally performed within an ABS (Anti-Lock System), being integrated in the control unit 7. Further, an engine control device transmits the current engine torque of the driving engine 1 to the driving dynamics controller 6.

The control method for rollover stabilization is preferably activated on account of the detection of a driving situation, in which an increased rollover danger of the vehicle must be assumed. Preferably, the existence of such a driving situation is detected when the amount of the lateral acceleration of the vehicle exceeds a predetermined activation threshold value.

It is arranged within the limits of the invention to perform the control method depending on the load condition of the vehicle. Preferably, it is provided that the activation threshold value is determined depending on the load condition.

The load condition is determined in computing unit 10 in the embodiment of the invention illustrated in FIG. 2. In an embodiment of the invention, this unit transmits a value m of the vehicle mass and/or a value $v_{ch}$ of the characteristic speed of the vehicle to the control unit 7, which adapts the control method to these quantities. Controller quantities can be adapted e.g. by way of a family of characteristics, which has been found out in driving tests before. Preferably, a family of characteristics is stored in the control unit, indicating the activation threshold value for the control method depending on the value of the vehicle mass and/or depending on the value of the characteristic speed. Principally, it is provided that the activation threshold value decreases with a rising vehicle mass and with a decreasing characteristic speed.

In alternative embodiments of the invention, it can also be arranged that within the computing unit 10 or within the control unit 7, a load condition variable is determined based on the vehicle mass and the characteristic speed and is taken into account for influencing the control method.

The invention provides a learning algorithm to establish the vehicle mass. The algorithm is based on the evaluation of different vehicle quantities, the majority of which within the driving dynamics controller 6 is also used to implement the control method in the control unit 7.

The determination of the vehicle mass commences with the start of the vehicle or the start of the vehicle electronics, respectively. Initially, a starting value for the vehicle mass is established. Preferably, different start values are predefined for different types of vehicles, the said values being selected in particular depending on the rollover stability of the vehicle of a defined type that is found out in driving tests. In a vehicle, e.g. a conventional passenger vehicle, in which the rollover stability is higher due to a relatively low center of gravity, the empty weight of the vehicle is preferably used as a start value.

In vehicles with a higher center of gravity and, thus, lower rollover stability such as SUVs or off-road vehicles or vans, the start value is higher than the empty weight of the vehicle. For example, the admissible maximum weight of the vehicle can be used as a start value when the rollover stability is low.

The dynamic determination of the vehicle mass is carried out based on a balance of forces of the longitudinal forces that act on the vehicle during an acceleration maneuver.

$$F_{drive} = F_{accel.} + F_{incline} + F_{roll} + F_{air} \quad (1)$$

applies. Herein, $F_{drive}$ designates the driving power provided by the driving engine, $F_{accel.}$ refers to the inertia force of the vehicle or the so-called resistance to acceleration, $F_{incline}$ designates the climbing resistance when driving on an incline, $F_{roll}$ implies the rolling resistance due to the rolling friction between the wheels and the roadway, and $F_{air}$ designates the air resistance.

In detail, it applies to the quantities in equation 1

$$F_{drive} = \frac{M}{r_{dyn}} \cdot \eta;$$

$$F_{accel.} = m_{veh} \cdot a_{ABS} + \frac{4 \cdot J_{wheel} + J_{red}}{r_{dyn}^2} \cdot a_{ABS};$$

$$F_{incline} = m_{veh} \cdot g \cdot \sin(\alpha);$$

$$F_{Roll} = f \cdot m_{Fveh} \cdot g; \quad F_{air} = c_W \cdot A \cdot \rho \cdot \frac{v^2}{2}$$

and the quantities herein have the following meaning:
$m_{veh}$: vehicle mass
M: torque of the driving engine
$\eta$: factor for considering the transmission ratios and the efficiency of the transmission
$a_{ABS}$: vehicle acceleration calculated from the wheel speeds
$J_{wheel}$: inertia moment of the wheels
$J_{red}$: inertia moment of the driving engine, the transmission and the remaining drive train reduced to the driving axle
$r_{dyn}$: dynamic wheel diameter
$\alpha$: angle of inclination of the roadway
f: rolling resistance coefficient
g: acceleration due to gravity
$c_w$: air resistance coefficient
A: cross-sectional surface of the vehicle
$\rho$: atmospheric density
v: vehicle speed The climbing resistance is established in the invention preferably by means of the longitudinal acceleration sensor, and the slope acceleration of the vehicle due to an existing downgrade is achieved from the difference between the longitudinal acceleration measured by means of the sensor and the acceleration calculated from the wheel speeds, which corresponds to the rate of change of the vehicle speed. $g \cdot \sin(\alpha) = a_{Sensor} - a_{ABS}$ applies during forward travel of the vehicle and thus:

$$F_{incline} = m_{veh}(a_{Sensor} - a_{ABS}) \quad (2)$$

For the vehicle mass, the following applies in an acceleration process in the forward direction:

$$m_{veh} = \frac{\frac{M}{r_{dyn}} \cdot \eta - \frac{4 \cdot J_{wheel} + J_{red}}{r_{dyn}^2} \cdot a_{ABS} - c_W \cdot A \cdot \rho \cdot \frac{v^2}{2}}{f \cdot g + a_{Sensor}} \quad (3)$$

The quantities $J_{wheel}$, $c_W$, A, ρ, f and g are constant or almost constant quantities, which are memorized in the computing unit 10. The dynamic wheel diameter can likewise be predetermined as a constant value. Furthermore, quantities are used, such as the engine torque, which are sent to the driving dynamics controller also to implement the control method, and quantities such as vehicle speed and vehicle acceleration $a_{ABS}$ are employed, which are determined within the driving dynamics controller 6.

The inertia moment $J_{red}$ of the drive train and the factor η depend especially on the gear engaged in the transmission and are continuously determined depending on the gear chosen, which is e.g. measured by means of a corresponding sensor and can be furnished by a transmission control. In addition, the factor η depends on further operating parameters, in particular on the operating temperature of the drive train. Therefore, it is preferably provided to predefine for each gear of the transmission a standard value for the factor η, which is modified in certain situations. More particularly, the factor is adapted at low operating temperatures to a reduced efficiency of the drive train, and the operating temperature can be sensed e.g. by means of a temperature sensor, or it can also be determined, in consideration of the outside temperature measured by means of a sensor, with the use of a vehicle model from the service life since the start of the vehicle.

The dynamic determination of the vehicle mass is then performed in driving situations, which are detected by way of predetermined criteria, being also referred to as learning conditions in the following. The following learning conditions have proven to be especially favorable, of which preferably all or single ones must be fulfilled in order to calculate the vehicle mass:

a) no control interventions of a driving dynamics controller, more particularly no braking interventions, are performed,
b) the accelerator pedal must be depressed at least by a predefined pedal travel,
c) the vehicle speed ranges between a low threshold value $v_{low}$, and a high threshold value $v_{high}$,
d) the engine rotational speed ranges between a low and a high threshold value,
e) the gradient of the vehicle acceleration $a_{ABS}$ is higher than a predetermined threshold value,
f) the second gear or a higher gear has been engaged in the transmission,
g) there is no gearshift in the transmission,
h) the vehicle acceleration $a_{ABS}$ is higher than a predetermined acceleration threshold value,
i) the yaw rate of the vehicle is lower than a predetermined yaw rate threshold value, and
j) the gradient of the engine torque is lower than a predetermined engine torque gradient threshold value.

The accelerator pedal position is sensed by means of an additional sensor, or established within the engine control device by way of an engine model and sent to the driving dynamics controller, the engine rotational speed as well as the engine torque is made available by the engine control device, the vehicle speed and the vehicle acceleration are determined within the driving dynamics controller 6, as has been described hereinabove, the yaw rate is sensed by means of the yaw rate sensor, and the gear engaged in the transmission is sensed by means of a sensor or provided by a gear control. The mentioned gradients of different quantities are established within the computing unit 10 based on the time variation of the corresponding quantities.

The period, during which all provided learning conditions are continuously satisfied, is referred to as a learning cycle.

During a learning cycle, an instantaneous assessed value for the vehicle mass is calculated by way of equation 2 in the computing unit 10 continuously or one time in each cycle step of the clocked operation of the driving dynamics controller. The cycle time (loop time) amounts to 10 ms, for example.

Preferably, an average value of the determined assessed values of the vehicle mass is then calculated. In order to update the value of the vehicle mass, which is decisive for influencing the driving dynamics control method, a weighted average value is subsequently determined from the above average value and the previous value of the vehicle mass, which corresponds to the start value in the first learning cycle. More specifically, updating is executed in that a weighted average value is produced from the previous decisive value and the assessed values of the vehicle masses are calculated within the learning cycle, and all the latter assessed values are included with the same weight in the average value. The weighting factors are defined in driving tests. Favorably, it can be provided in particular that, in the event of a higher number of learning cycles passed through, the assessed values of the vehicle mass defined within a learning cycle are included with a higher weight in the average value.

In this arrangement, a method has proved to be especially favorable where a first updating of the vehicle mass value takes place after the first hundred loops of a learning cycle, and additional updating operations take place after further 50 loops of the learning cycle in each case.

Furthermore, an averaging operation is executed based on the different instantaneous assessed values, which are calculated within a learning cycle, preferably only after the values have been filtered. It is arranged then that the values are limited to a defined band, i.e. a predetermined minimum or maximum value. The empty weight of the vehicle can be predefined as a minimum value, for example. The maximum value can lie roughly by a defined amount in excess of the laden weight of the vehicle. After the limitation, the value is filtered preferably in a PT1 element, i.e. a low-pass filter. The value filtered in this way is then included in the average value to be produced.

As soon as one of the provided learning conditions is no longer satisfied, a learning cycle is completed, and a counter is incremented by the value 1, beginning with a value of zero when starting the vehicle.

It has proved to be especially favorable to use the value of the counter for an adaptation of the learning conditions so that they can be changed with a rising number of the learning cycles and, in particular, can be more narrowly restricted. It is achieved this way that the vehicle mass can be defined with greater precision as the duration of driving rises. In particular, an adaptation of the learning conditions h, i and j is preferably provided, and the acceleration threshold value (condition h) is gradually reduced, and the yaw rate threshold value (condition i) and the engine torque gradient threshold value (condition j) are increased in equal steps. Preferably, first threshold values are predetermined, which are made the basis for the first two learning cycles (counter value is 0 or 1), second threshold values, which are used within the learning cycles three to eleven (counter values 2 to 10), as well as third threshold values for the further learning cycles (counter values exceeding 10).

Commencing with the start value upon start of the vehicle, the decisive value for the vehicle mass is updated continuously in the fashion described hereinabove within the learning cycles that are passed through during driving. The respectively current value of the vehicle mass is used to adapt the activation threshold value for the control method for the rollover stabilization of the vehicle. The adaptation can occur continuously, and the activation threshold value is defined depending on the current vehicle mass value, e.g. by way of a predetermined characteristic curve. However, a gradual adaptation is also feasible, for which several ranges for the vehicle mass value are predetermined, allocated to which is one activation threshold value in each case.

In addition to the determination of the load condition of the vehicle by way of the vehicle mass, it is further provided to establish the load condition by way of the so-called characteristic speed of the vehicle. The square thereof is given by $$v_{ch}^2 = \frac{\frac{d\psi}{dt} \cdot l \cdot v^2}{v \cdot \delta - \frac{d\psi}{dt} \cdot l} \qquad (4)$$

Herein implies:
$v_{ch}$: characteristic speed
$d\psi/dt$: yaw rate of the vehicle
l: wheel base of the vehicle
δ: steering angle
v: vehicle speed The characteristic speed of a vehicle is especially influenced by its self-steering properties, which in turn vary depending on the load condition of the vehicle. It has been found out in particular that the vehicle exhibits a more pronounced understeering behavior with the vehicle mass rising and/or the point of gravity of the vehicle shifting in an upward direction. The characteristic speed or the square thereof decreases as a result.

Thus, it can be concluded with a reducing characteristic speed that the rollover stability diminishes due to an increase of the vehicle mass and/or due to a shift of the center of gravity of the vehicle in an upward direction, and such a shift of the vehicle's center of gravity generally results due to an additional load of the vehicle.

Equation 4 is used to dynamically define the characteristic vehicle speed in the computing unit 10, and the necessary quantities are sensed by means of the sensors $8_1, \ldots 8_n$, with the exception of the constant wheel base that is stored in a memory of the computing unit 10. The equation 4 is evaluated during cornering maneuvers in predetermined driving situations, which are detected e.g. by way of predetermined values of the steering angle and the yaw rate of the vehicle. It can be arranged in particular that a learning algorithm determines the value of the characteristic speed, and instantaneous values for the characteristic speed are defined in several driving situations of this kind, from which values an average value is produced. The average value can be updated in each case when the predetermined driving situations are encountered.

When the dynamically defined value of the characteristic vehicle speed is lower than the value in the empty condition of the vehicle, it is assumed that the rollover stability is reduced due to an additional load of the vehicle.

The dynamically defined value of the characteristic speed is likewise used to adapt controller parameters, and the activation threshold value for the control method is preferably changed for the rollover stabilization. The adaptation can take place continuously, and the activation threshold value can be defined depending on the value of the characteristic driving speed, e.g. by way of a predetermined characteristic curve, which has previously been established in driving tests. A gradual adaptation is likewise possible, for which several ranges for the vehicle mass value are predefined, allocated to which is one activation threshold value in each case.

As has been mentioned before, it can also be provided that a load condition quantity can be determined from the vehicle mass and the characteristic speed within the computing unit 10 or within the control unit, which quantity is used to adapt the control method in the control unit 7.

The invention claimed is:

1. A method for stabilizing a vehicle, wherein a control method is used to determine correcting variables for activating at least one actuator, by means of which a driving performance of the vehicle can be influenced, the method comprising the steps of:
   determining that a first predetermined driving situation prevails,
   counting a number of learning cycles of determining that the first predetermined driving situation prevails;
   changing a criterion of the first predetermined driving situation depending on the number of learning cycles, the criterion being more narrowly restricted with a rising number of learning cycles;
   determining a balance of forces acting on the vehicle;
   determining a vehicle mass based on the balance of forces;
   determining a load condition of the vehicle based on the vehicle mass;
   determining, based on the load condition, an activation threshold of a dynamic control variable pertaining to a vehicle behavior;
   determining that the control variable has exceeded the activation threshold; and
   activating actuators influencing the control variable in a direction toward reducing the control variable to a value smaller than the activation threshold.

2. The method as claimed in claim 1, wherein one criterion of the first predetermined driving situation is a vehicle acceleration exceeding an acceleration threshold value.

3. The method as claimed in claim 1, wherein one criterion of the first predetermined driving situation is an absolute value of a yaw rate of the vehicle being lower than a yaw rate threshold value.

4. The method as claimed in claim 1, wherein one criterion of the first predetermined driving situation is an absolute value of a gradient of an engine torque being lower than an engine torque gradient threshold value.

5. The method as claimed in claim 1, wherein the step of determining the vehicle mass is established by way of a learning algorithm including the substeps of
   establishing individual instantaneous assessed values for the vehicle mass at different points in time in learning cycles, and
   determining the vehicle mass from calculating an average of a current instantaneous assessed value with a previously determined vehicle mass.

6. The method as claimed in claim 5, wherein the step of averaging involves weighting the current instantaneous assessed value of the vehicle mass with a smaller factor than a weighting factor applied to the previously determined vehicle mass for calculating the average.

7. The method as claimed in claim 1, wherein the activation threshold is reduced with a rising vehicle mass.

8. The method as claimed in claim 1, wherein the dynamic control variable is a lateral acceleration of the vehicle.

9. A method for stabilizing a vehicle, wherein a control method is used to determine correcting variables for activating at least one actuator, by means of which a driving performance of the vehicle can be influenced, the method comprising the steps of:
   determining that a first predetermined driving situation prevails;

counting a number of learning cycles of determining that the first predetermined driving situation prevails;
changing a criterion of the first predetermined driving situation depending on the number of learning cycles;
determining a balance of forces acting on the vehicle;
determining a vehicle mass based on the balance of forces by way of a learning algorithm including the substeps of:
   establishing individual instantaneous assessed values for the vehicle mass at different points in time in the number of learning cycles; and
   determining the vehicle mass from calculating an average of a current instantaneous assessed value with a previously determined vehicle mass by weighting the current instantaneous assessed value of the vehicle mass with a smaller weighting factor than a weighting factor applied to the previously determined vehicle mass for calculating the average, the weighting factors having a ratio that depends on the number of the learning cycles;
determining a load condition of the vehicle based on the vehicle mass,
determining, based on the load condition, an activation threshold of a dynamic control variable pertaining to a vehicle behavior;
determining that the control variable has exceeded the activation threshold; and
activating actuators influencing the control variable in a direction toward reducing the control variable to a value smaller than the activation threshold.

10. A method for stabilizing a vehicle, wherein a control method is used to determine correcting variables for activating at least one actuator, by means of which a driving performance of the vehicle can be influenced, the method comprising the steps of:
determining that a first predetermined driving situation prevails;
determining a balance of forces acting on the vehicle;
determining a vehicle mass based on the balance of forces;
determining a load condition of the vehicle based on the vehicle mass;
determining, based on the load condition, an activation threshold of a dynamic control variable pertaining to a vehicle behavior;
determining that the control variable has exceeded the activation threshold;
activating actuators influencing the control variable in a direction toward reducing the control variable to a value lower than the activation threshold;
determining that a second driving situation prevail; and
establishing a characteristic speed by means of the equation $$v_{ch}^2 = \frac{\frac{d\psi}{dt} \cdot l \cdot v^2}{v \cdot \delta - \frac{d\psi}{dt} \cdot l}$$

with
$v_{ch}$: characteristic speed
$d\psi/dt$: yaw rate of the vehicle
$l$: wheel base of the vehicle
$\delta$: steering angle
$v$: vehicle speed.

11. The method as claimed in claim 10, wherein the second driving situation is a cornering maneuver.

12. The method as claimed in claim 10, the activation threshold decreases with a reducing characteristic speed.

* * * * *

UNITED STATES PATENT AND TRADEMARK OFFICE
CERTIFICATE OF CORRECTION

| | | |
|---|---|---|
| PATENT NO. | : 8,271,159 B2 | Page 1 of 1 |
| APPLICATION NO. | : 11/886496 | |
| DATED | : September 18, 2012 | |
| INVENTOR(S) | : Jürgen Kröber et al. | |

It is certified that error appears in the above-identified patent and that said Letters Patent is hereby corrected as shown below:

Column 11:

In claim 10, line 13, delete "prevail" and insert --prevails--.

Signed and Sealed this
Eighteenth Day of December, 2012

David J. Kappos
*Director of the United States Patent and Trademark Office*